United States Patent
Tomasicchio et al.

(10) Patent No.: US 10,313,001 B2
(45) Date of Patent: Jun. 4, 2019

(54) HYBRID PROCESSOR WITH SWITCHING CONTROL BASED ON DYNAMIC BANDWIDTH ALLOCATION FOR MULTI-BEAM SATELLITE SYSTEMS

(71) Applicant: Thales Alenia Space Italia S.p.A. Con Unico Socio, Rome (IT)

(72) Inventors: Giuseppe Tomasicchio, Rome (IT); Gaetano Pastore, Rome (IT); Guglielmo Lulli, Rome (IT); Domenico Giancristofaro, Rome (IT); Cinzia Moca, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 0 days.

(21) Appl. No.: 15/756,000

(22) PCT Filed: Apr. 7, 2017

(86) PCT No.: PCT/EP2017/058471
§ 371 (c)(1),
(2) Date: Feb. 27, 2018

(87) PCT Pub. No.: WO2017/174811
PCT Pub. Date: Oct. 12, 2017

(65) Prior Publication Data
US 2019/0028185 A1    Jan. 24, 2019

(30) Foreign Application Priority Data
Apr. 7, 2016  (IT) ........................ 102016000035942

(51) Int. Cl.
*H04B 7/204*    (2006.01)
*H04Q 3/00*    (2006.01)
(Continued)

(52) U.S. Cl.
CPC ......... *H04B 7/2041* (2013.01); *H04B 7/0404* (2013.01); *H04B 7/0408* (2013.01);
(Continued)

(58) Field of Classification Search
CPC .............. H04B 7/2041; H04B 7/18513; H04B 10/118; H04B 7/0408; H04B 7/185;
(Continued)

(56) References Cited

U.S. PATENT DOCUMENTS 6,377,561 B1   4/2002  Black et al.
7,298,728 B2   11/2007 Golla et al.
(Continued)

FOREIGN PATENT DOCUMENTS

EP    2728770 A2    5/2014

OTHER PUBLICATIONS

Liu Kai et al., "Fault-tolerant cell dispatching for onboard space-memory-memory clos-network packet switches", 2015 IEEE 16th International Conferecne on High Performance Switching and Routing (HPSR), IEEE, Jul. 1, 2015.
(Continued)

*Primary Examiner* — Keith Ferguson
(74) *Attorney, Agent, or Firm* — McCarter & English, LLP

(57) ABSTRACT

A hybrid processor system for use on board a telecommunications multi-beam satellite is provided that is controllable by a network control center via one or more control channels. The system links to ground terminals by: providing uplink and downlink traffic channels on several satellite beams; routing atomic switched information blocks from the uplink traffic channels to the downlink traffic channels; and exchanging signaling data with the ground terminals on one or more uplink signaling channels and one or more downlink signaling channels. The atomic switched information blocks
(Continued)

have the same given time duration and the same given baseband bandwidth. The hybrid processor system includes a burst switching processor and an on-board processor controller which is configured to store service information items indicative of: the given time duration and the given baseband bandwidth of the atomic switched information blocks; the respective uplink bandwidth, the respective uplink frequencies, a respective time length of the respective uplink time slots, and respective structure features of the respective uplink time frames and superframes of each uplink channel; the respective downlink bandwidth, the respective downlink frequencies, a respective time length of the respective downlink time slots, and respective structure features of the respective downlink time frames and superframes of each downlink channel; and quality of service and priority rules for serving the ground terminals. The on-board processor controller is further configured to extract, from incoming signaling data capacity requests sent by the ground terminals by demodulating and decoding the incoming signaling data.

9 Claims, 9 Drawing Sheets

(51) Int. Cl.
*H04B 7/0404* (2017.01)
*H04B 7/0408* (2017.01)
*H04B 7/185* (2006.01)
*H04B 7/0456* (2017.01)

(52) U.S. Cl.
CPC ....... *H04B 7/0486* (2013.01); *H04B 7/18504* (2013.01); *H04Q 3/0004* (2013.01)

(58) Field of Classification Search
CPC ............ H04B 7/18571; H04B 7/18504; H04B 7/18502; H04B 7/0695
See application file for complete search history.

(56) References Cited

U.S. PATENT DOCUMENTS

2003/0166401 A1 9/2003 Combes
2010/0315949 A1* 12/2010 Agarwal ............ H04B 7/18515
370/235
2012/0300697 A1 11/2012 Agarwal

OTHER PUBLICATIONS

PCT International Search Report and Written Opinion for PCT/EP2017/058471 dated May 30, 2017.
Soung C. Liew et al., "Principles of Broadband Switching and Networking", Apr. 2010, Wiley, ISBN: 978-0-47113901-0 and R.E. Crochiere et al., "Multirate Digital Signal Processing", Prentice Hall, 1983.

* cited by examiner

FIG. 7

INPUT

| 15 | 16 | 17 G | 18 H | 19 |
|---|---|---|---|---|
| 10 | 11 | 12 E | 13 F | 14 |
| 5 | 6 D | 7 | 8 | 9 |
| 0 | 1 | 2 B | 3 C | 4 |
| A | | | | |

OUTPUT

| 15 E | 16 E | 17 E | 18 A | 19 C |
|---|---|---|---|---|
| 10 C | 11 G | 12 F | 13 B | 14 G |
| 5 C | 6 A | 7 D | 8 F | 9 H |
| 0 A | 1 C | 2 B | 3 A | 4 C |

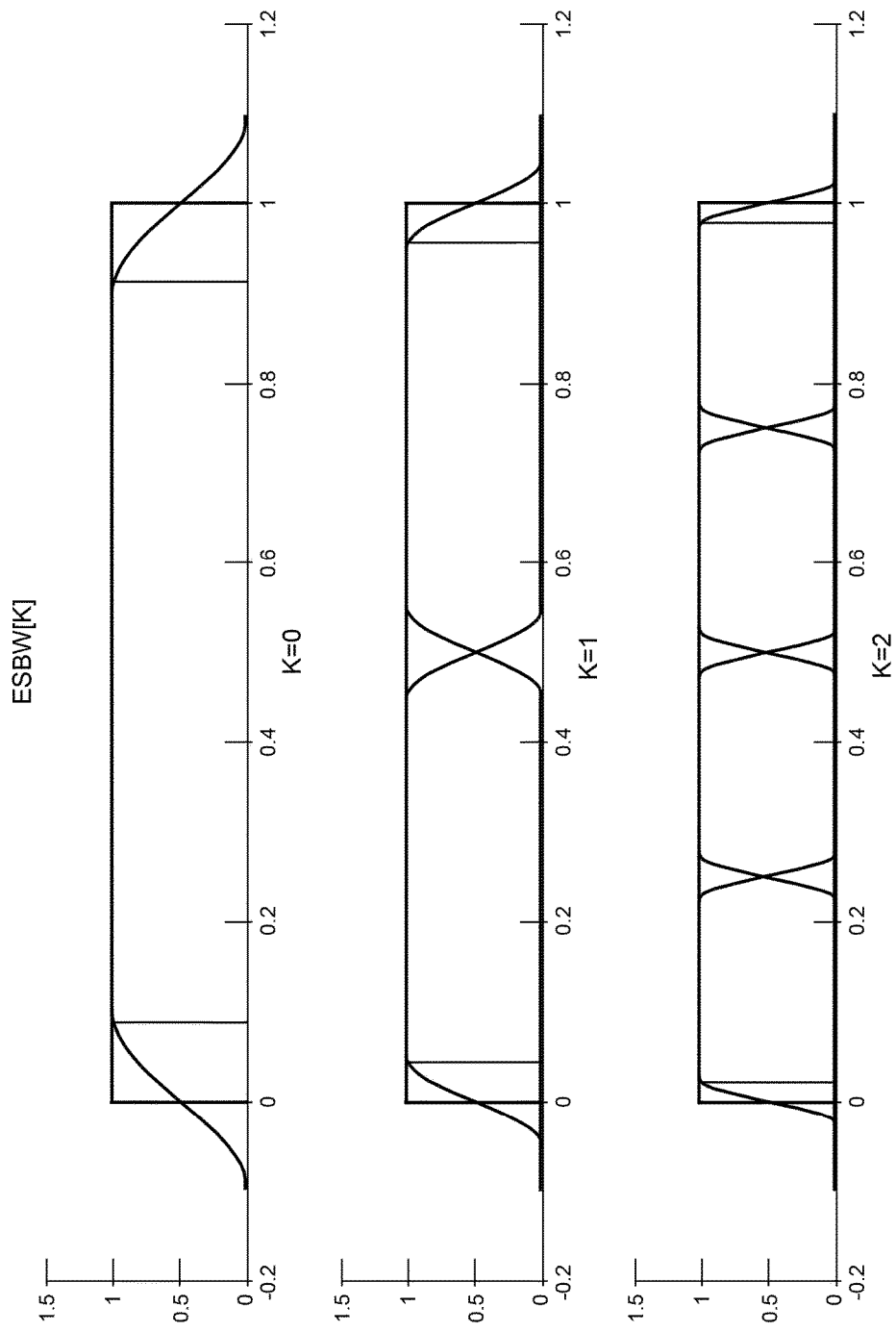

HYBRID PROCESSOR WITH SWITCHING CONTROL BASED ON DYNAMIC BANDWIDTH ALLOCATION FOR MULTI-BEAM SATELLITE SYSTEMS

CROSS-REFERENCE TO RELATED APPLICATIONS

This application is a 35 U.S.C. § 371 National Stage filing of International Application No. PCT/EP2017/058471 filed on Apr. 7, 2017, which claims priority to Italian Patent Application IT 102016000035942 filed on Apr. 7, 2016.

TECHNICAL FIELD OF THE INVENTION

The present invention relates, in general, to satellite telecommunications and, in particular, to multi-beam connection-oriented satellite communications.

STATE OF THE ART

Nowadays, as is known, satellite systems are considered a fast and cost-effective solution to the more and more increasing demand for extra bandwidth and connectivity. In fact, satellite systems can interconnect far-flung areas by providing broadband, direct links over long distances, and allow to by-pass congested and/or unsafe links.

In such a scenario, satellite payloads have to comply with more and more demanding requirements in terms of improved switching capabilities, enhanced efficiency and flexibility in managing radio resources, and optimized handling of quality and priority hierarchies.

In particular, emerging satellite communications scenarios based on Internet Protocol (IP) and standardized air interfaces (e.g., Digital Video Broadcasting-Return Channel via Satellite (DVB-RCS), Digital Video Broadcasting-Satellite-Second Generation (DVB-S2), etc.) typically involve a huge number of end points which may be distributed everywhere on Earth and with applications characterized by high data rate and quality/priority differentiation. This results in very demanding requirements for satellite payloads in terms of connectivity and resource handling flexibility. The access delay (defined as the time interval between arrival of a packet to an end point and the time when the end point can use the bandwidth for transmitting said packet) should be as lower as possible in order to mitigate degradation effects on time-sensitive applications (e.g., voice, video, etc.).

Moreover, evolution of satellite systems for telecommunications has been driven by the need to evolve from a star-type network configuration, typical of transparent satellite architectures, to a mesh-type network configuration, achievable, for example, by means of regenerative satellite architectures. This kind of architectures typically allows to achieve a high degree of flexibility in managing traffic, a reduced delay and a higher radio resource efficiency; however, due to implementation complexity of the regenerative approach and the typical technological constraints affecting space applications, current payload developments have been characterized by limited capacity and reduced communication bandwidth. For this reason, always in a perspective of mesh networks (i.e., with user links implemented only via a satellite without the use of feeder links), translucent architectures have been introduced (also known as digital transparent payloads). By means of this kind of architectures it is possible to achieve a broadband connectivity while maintaining payload complexity affordable.

In this scenario, satellite switching capabilities play a key role. Broadly speaking, two main categories are traditionally defined for on-board switching, namely: circuit switching and packet switching.

The former is based on a deterministic approach and, hence, is designed to manage predictable traffic. In fact, with deterministic traffic profiles, a high switching capacity can be achieved by means of predefined resource allocations. An example of deterministic switching is the so-called Satellite Switched Time Division Multiple Access (SS-TDMA), wherein Time-Division Multiplexing (TDM) access patterns and switching plans are established for constant flows of tens of seconds or more, and set-up and termination of calls are carried out on the basis of signaling messages between users and a ground Network Operations Center (NOC), also known as Network Control Centre (NCC). The satellite payload can be transparent if there is no need to modify the uplink and downlink waveforms. Otherwise, if both the uplink and downlink waveforms need to be different for specific reasons (for example, in order to reuse existing terrestrial receiver), circuit switching can be implemented also with a regenerative satellite payload.

Instead, packet switching is designed to provide dynamic switching capabilities, which are required when the number of users is high and the traffic to be switched is unpredictable. With packet switching, traffic is generally routed to the downlink beams based on information contained in packet headers, access patterns and switching plans are not correlated, and statistical multiplexing is achieved by means of a large number of on-board buffers. In particular, the satellite payload should process the whole traffic flow up to the link layer, including digital demodulation and decoding operations. Therefore, packet switching is preferably implemented with regenerative payloads.

More in detail, examples of existing multi-beam satellite communication solutions include:
- digital transparent solutions with switching stages that are quasi-static in frequency and space domains, thereby not allowing dynamic one-hop connectivity;
- solutions with blocking dynamic switch routing capabilities conceived as fast-switching fabric with statistical blocking occurrences in the destinations (therefore with potential packet switching losses), said solution being not connection-oriented;
- solutions with switching control designed for a specific legacy scheme/logic for space routing decision process;
- solutions with non-reconfigurable on-board switching control stages;
- solutions with on-board processing with ground-to-satellite unprotected signaling flows.

More and more in detail, in the following some specific existing multi-beam satellite communication solutions will be briefly presented along with related drawbacks.

Fully regenerative SS-TDMA solutions are known, which are neither suitable for high throughput satellites, nor reconfigurable (in fact, air interface implements a specific standard or proprietary solution), thereby not allowing to handle potential modifications in air interface standards.

Also microwave switched matrix/digital circuit switched solutions are known, most of which are oriented to Single Channel Per Carrier (SCPC) with low flexibility and low resource efficiency.

Moreover, digital transparent processing with no frame buffering is also known, with limited memory on-board, low use of the resources, reduced connectivity flexibility and quasi-static switching in frequency and space domains.

Also Radio Burst Switching (RBS) is known. For example, U.S. Pat. No. 7,298,728 B2 discloses a scheduling system and method for RBS operable with a burst switching element, wherein control information is provided to the burst switching element via a separate burst header that precedes data bursts on ingress data channels. In particular, according to U.S. Pat. No. 7,298,728 B2, a series of scheduling determinations are made in a select order such that packet treatment (i.e., processing for transmission, buffering, or packet dropping) is optimized with respect to packet loss and available buffer space. Additionally, control information received in the burst headers can be also used to reserve output data channel bandwidth to future incoming data packets in a forward-looking scheduling mechanism. More in general, RBS provides a high throughput burst switching by processing burst headers injected by a ground control station; terminals inject their bursts within the time among these headers respecting guard time. However, RBS does not guarantee lossless burst switching, requires proprietary equipment for burst header processing at both terminal and hub sides, and, most of all, introduces larger access delay due to on-ground resource handling as well as extra signaling overhead (e.g., with respect that one necessary to support synchronization and system logon for DVB-RCS systems) to cope with the burst header mechanism for switch configuration.

Furthermore, fully regenerative Satellite Switched Multi-Frequency TDMA (SS-MF-TDMA) architectures are also known, which provide a connection-oriented solution that is unsuitable for high throughput, with limited reconfigurability and specific implementation of DVB-RCS terminals for channel ID association to the destination satellite coverage beams. Fully regenerative SS-MF-TDMA has a large impact on the satellite payload in terms of mass and power consumption. In addition, this solution introduces large access delay due to on-ground resource handling, while the air interface protocol is constrained by the adoption of the DVB-RCS standard.

Finally, fully regenerative satellite on-board packet switching architectures are also known which are constrained by a specific standard or proprietary air interface adoption, with limited functionality for on-board reconfiguration from a Network Operation Center (NOC). These solutions have a large impact on the satellite payload in terms of mass and power consumption.

An example of fully regenerative satellite architecture is provided in U.S. Pat. No. 6,377,561 B1, which relates to a data communication satellite system and a method of carrying multi-media traffic, wherein the data communication satellite system provides switched transport services for multi-media networks, and wherein access schemes, protocols and switching techniques are combined to offer dynamic bandwidth-on-demand on a cell-by-cell basis.

In particular, the data communication satellite system according to U.S. Pat. No. 6,377,561 B1 has a fully regenerative architecture with an air interface and waveform supporting ATM-like cells (where ATM stands for Asynchronous Transfer Mode) and wherein both traffic and signaling data are demodulated.

In fact, according to U.S. Pat. No. 6,377,561 B1, capacity requests are transmitted in-band (i.e., an in-band signaling approach is used) and, hence, there is the need to demodulate all received data packets in order to extract information data, capacity-request-related data and traffic routing data.

Moreover, a further example of fully regenerative satellite architecture is provided also in US 2012/300697 A1, which relates to dynamic frequency assignment in a multi-beam satellite system, wherein available frequency channels are dynamically assigned to particular beams of the multi-beam satellite system. According to US 2012/300697 A1, the frequency assignment may be based on the amount of frequency allocated to particular beams of the multi-beam satellite system, utilizing a given frequency selection method employing frequency reuse constraints. There may be a number of distinct frequency channels that are each assigned to one or more different beams. Such a system may be made up of a satellite in communication with terminals (e.g., user terminals or gateways). The satellite may receive and compile bandwidth request data from the terminals, and use this information in frequency assignment.

As previously said, also the multi-beam satellite system according to US 2012/300697 A1 has a fully regenerative architecture. Additionally, said multi-beam satellite system employs a fixed air interface and waveform supporting a fixed superframe length.

Instead, US 2003/166401 A1 discloses a resource manager for satellite telecommunications based on a blocking switch approach with congestion control.

In particular, the resource manager according to US 2003/166401 A1 is used in a satellite telecommunication system including user terminals sending data to spots via a satellite, all data streams from a given terminal to the same given destination spot constituting a virtual path comprising a set of uplinks from the terminal to the satellite and a set of downlinks from the satellite to the spot. Said resource manager includes a central entity associated with each satellite for receiving requests sent by the user terminals and each expressing a requirement to use resources of the satellite corresponding to the virtual path. Said central entity groups the requests into request groups each associated with a set of uplinks from the same spot to the destination spot, the set of uplinks constituting a virtual link, and determines authorized resources for each request group.

The solution according to US 2003/166401 A1 relates to a circuit switched architecture (the switch could be transparent up to regenerative), wherein both a resource manager and a congestion controller are employed, and wherein said congestion controller is configured by the resource manager on the basis of resource assignment process outcomes. According to US 2003/166401 A1, resources could be requested by using in-band signaling, or by exploiting signaling channels (i.e., out-of-band signaling).

Instead, as for switching algorithms, all the existing solutions for broadcast and multicast switch configurations (such as those presented by Soung C. Liew and Tony T. Lee in the book entitled "*Principles of Broadband Switching and Networking*", April 2010, Wiley, ISBN: 978-0-471-13901-0) don't guarantee the minimization of the hardware resources when a non-blocking routing algorithm needs to be implemented. As a matter of fact, the switch design can be seen from two different points of view:

1. the hardware architecture needs to be a strictly non-blocking network from the physical connectivity point of view, but, at the same time, needs to have the minimum possible size to allow the on-board implementation;

2. the routing algorithm needs to find the proper configuration of each elementary switch sub-block in order to achieve the required connection without blocking condition and maximizing the speed of the algorithm implementation.

To achieve the second goal, e.g. identifying a routing algorithm that has also broadcast, multicast and unicast capabilities, it is not sufficient to choose the most simple strictly non-blocking switch hardware architecture, but, at the current state of the art, non-blocking routing algorithms are known only if the switch is slightly expanded with respect to the most simple strictly non-blocking switch, or if a random routing policy is considered (in this connection, reference can be made to paragraph 6.1.3 of the above book "Principles of Broadband Switching and Networking"). In particular, said paragraph 6.1.3 also addresses a second way to route packets in each module of the switch; however, when this second way is applied, a blocking condition always occurs if a central module of a five-stage architecture is not addressed in the correct way, requiring in some cases an exhaustive search for the solution. No direct computation algorithms are known in the literature.

As for multi-stage switch architecture, reference can be made, for example, to EP 2 728 770 A2, which relates to a satellite transponder with a system and a method for processing communication data by analog digital conversion of the signals, formation of frequency channels and combination of them by a switch with a plurality of stages (specifically, a three-stage Clos switch network).

In particular, EP 2 728 770 A2 discloses an apparatus comprising: an analog front end configured to receive an analog input; analog to digital converters configured to convert the analog input to digital signals; a digital channelizer configured to process the digital signals to generate a plurality of frequency slices; a digital combiner configured to assemble the plurality of frequency slices to form output sub-bands; and a digital switch configured to route the plurality of frequency slices from the digital channelizer to the digital combiner, wherein the digital switch comprises a multiple stage switch network (specifically, a three-stage Clos switch network) comprising ingress stage switches, middle stage switches, and egress stage switches.

OBJECT AND SUMMARY OF THE INVENTION

The Applicant has noticed that on-board packet routing and dynamic Bandwidth-on-Demand (BoD) capabilities are crucial in order to efficiently support time-varying IP traffic exchange between one or more end points. On the other hand, processing capabilities should limit their impact on the satellite payload in terms of mass and power consumption as well as complexity. Moreover, in consideration of continuous evolution of air interfaces compared to lifetime of satellites (typically at least 15 years), the risk of a rapid obsolescence of a payload based on on-board processing capabilities needs to be taken into account.

Therefore, an object of the present invention is that of providing a satellite communication technology which, in general, overcomes, at least in part, the aforesaid drawbacks of existing solutions and, in particular, provides one or more of the following features:
- multi-beam connection-oriented satellite communications with intra-beam/inter-beam on-board high performance packet switching for one-hop meshed/star network architecture topologies with Dynamic Bandwidth Allocation Capability (DBAC);
- flexibility with respect to waveforms/standards evolution and support for existing signaling protocol standards (at both terminal and hub levels) and their modifications via an on-board Software Defined Radio (SDR) management;
- an on-board fast non-blocking switching function for both unicast and multicast cases based on a DBAC;
- affordable on-board complexity while maintaining full MF-TDMA connectivity flexibility;
- uncoupling of on-board design from frequency plans (frame size and channel frequency placement) with a multiframing TDMA on-board switching such that to support concurrent existence of multiple frame durations;
- minimization of the on-board stored information, while achieving a sum-to-one transfer function of non-critically sampled channelizers;
- dynamic optimization of the on-board payload resources on the basis of network traffic;
- protection of on-board signaling message handling.

This and other objects are achieved by the present invention in that it relates to a hybrid processor system, as defined in the appended claims.

In particular, the present invention concerns a hybrid processor system for use on board a telecommunications multi-beam satellite, wherein said telecommunications multi-beam satellite is controllable by a network control centre via one or more control channels, and is designed to link ground terminals by:
- providing uplink and downlink traffic channels on several satellite beams;
- routing atomic switched information blocks from the uplink traffic channels to the downlink traffic channels; and
- exchanging signaling data with the ground terminals on one or more uplink signaling channels and one or more downlink signaling channels;

wherein all the atomic switched information blocks have one and the same given time duration and one and the same given baseband bandwidth;

wherein each uplink traffic channel has a respective uplink bandwidth including respective uplink frequencies, and carries, at said respective uplink frequencies, respective atomic switched information blocks in respective uplink time slots organized into respective uplink time frames forming respective uplink time superframes;

and wherein each downlink traffic channel has a respective downlink bandwidth including respective downlink frequencies, and carries, at said respective downlink frequencies, respective atomic switched information blocks in respective downlink time slots organized into respective downlink time frames forming respective downlink time superframes.

Said hybrid processor system comprises:
a burst switching processor; and
an on-board processor controller.
Said on-board processor controller is configured to:
store service information items indicative of
  said given time duration and said given baseband bandwidth of the atomic switched information blocks,
  the respective uplink bandwidth, the respective uplink frequencies, a respective time length of the respective uplink time slots, and respective structure features of the respective uplink time frames and superframes of each uplink channel,
  the respective downlink bandwidth, the respective downlink frequencies, a respective time length of the respective downlink time slots, and respective structure features of the respective downlink time frames and superframes of each downlink channel, and
  quality of service and priority rules for serving the ground terminals;
extract, from incoming signaling data received on the uplink signaling channel(s), capacity requests sent by the ground terminals, wherein the capacity requests are extracted by the on-board processor controller (12) by demodulating and decoding the incoming signaling data;

assign to each pair or set of ground terminals to be linked respective frequency, space and time resources on the basis of the stored service information items and of all the capacity requests received from the ground terminals, wherein said respective frequency, space and time resources includes one or more respective uplink frequencies of one or more respective uplink channels provided on one or more respective satellite beams, one or more respective uplink time slots in one or more respective uplink time frames in one or more uplink time superframes of said one or more respective uplink channels, one or more respective downlink frequencies of one or more respective downlink channels provided on said one or more respective satellite beams, and one or more respective downlink time slots in one or more respective downlink time frames in one or more downlink time superframes of said one or more respective downlink channels;

generate resource assignment messages indicative of the frequency and time resources assigned to the ground terminals;

generate outgoing signaling data to be transmitted to the ground terminals on the downlink signaling channel(s), wherein the outgoing signaling data are generated by the on-board processor controller (12) by encoding and modulating the resource assignment messages;

generate a routing map on the basis of the frequency, space and time resources assigned to the ground terminals;

generate switching commands based on the routing map; extract, from control data received on the control channel(s), control messages sent by the network control centre, wherein the control messages are extracted by the on-board processor controller (12) by demodulating, decoding and decrypting the control data; and update the stored service information items on the basis of the control messages.

The burst switching processor is configured to route the atomic switched information blocks on the basis of the switching commands generated by the on-board processor controller.

Whereby:

the on-board processor controller is configured to operate in a regenerative way with respect to the signaling data, and is reconfigurable by the network control centre; and the burst switching processor is configured to operate in a digital transparent way with respect to the atomic switched information blocks, and is operable by the on-board processor controller to route the atomic switched information blocks in frequency, space and time domains.

Preferably, the burst switching processor comprises a five-stage Clos switching network including a first three-stage Clos network and, in cascade, a second three-stage Clos network designed for, respectively, copy and unicast functions; wherein said five-stage Clos switching network includes an inner intermediate stage shared by said first and second three-stage Clos networks; and wherein the on-board processor controller is configured to generate the switching commands by implementing a self-routing algorithm including:

generating, on the basis of the routing map, a matrix representing the five-stage Clos switching network; and processing said matrix so as to produce a non-blocking routing configuration for said five-stage Clos switching network.

BRIEF DESCRIPTION OF THE DRAWINGS

For a better understanding of the present invention, preferred embodiments, which are intended purely by way of non-limiting examples, will now be described with reference to the attached drawings (all not to scale), wherein:

FIG. 7 schematically illustrates an example of multicast switching according to an aspect of the present invention;

FIGS. 9 and 10 illustrate, respectively, sum-to-one concept according to an aspect of the present invention and related trade-off between bandwidth efficiency and complexity.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope consistent with the principles and features disclosed herein and defined in the appended claims.

The present invention relates to a satellite communication technology for multi-beam connection-oriented communications with intra-beam/inter-beam on-board high performance packet switching and for one-hop meshed/star network architecture topologies with Dynamic Bandwidth Allocation Capability (DBAC).

In particular, the present invention concerns a SS-MF-TDMA solution for connection-oriented high-performance meshed/star intra-beam/inter-beam frame-by-frame switching at burst level, such that to serve, with single-hop transition delay, on-demand traffic capacity requests from ground terminals (i.e., user terminals).

Figure 1:
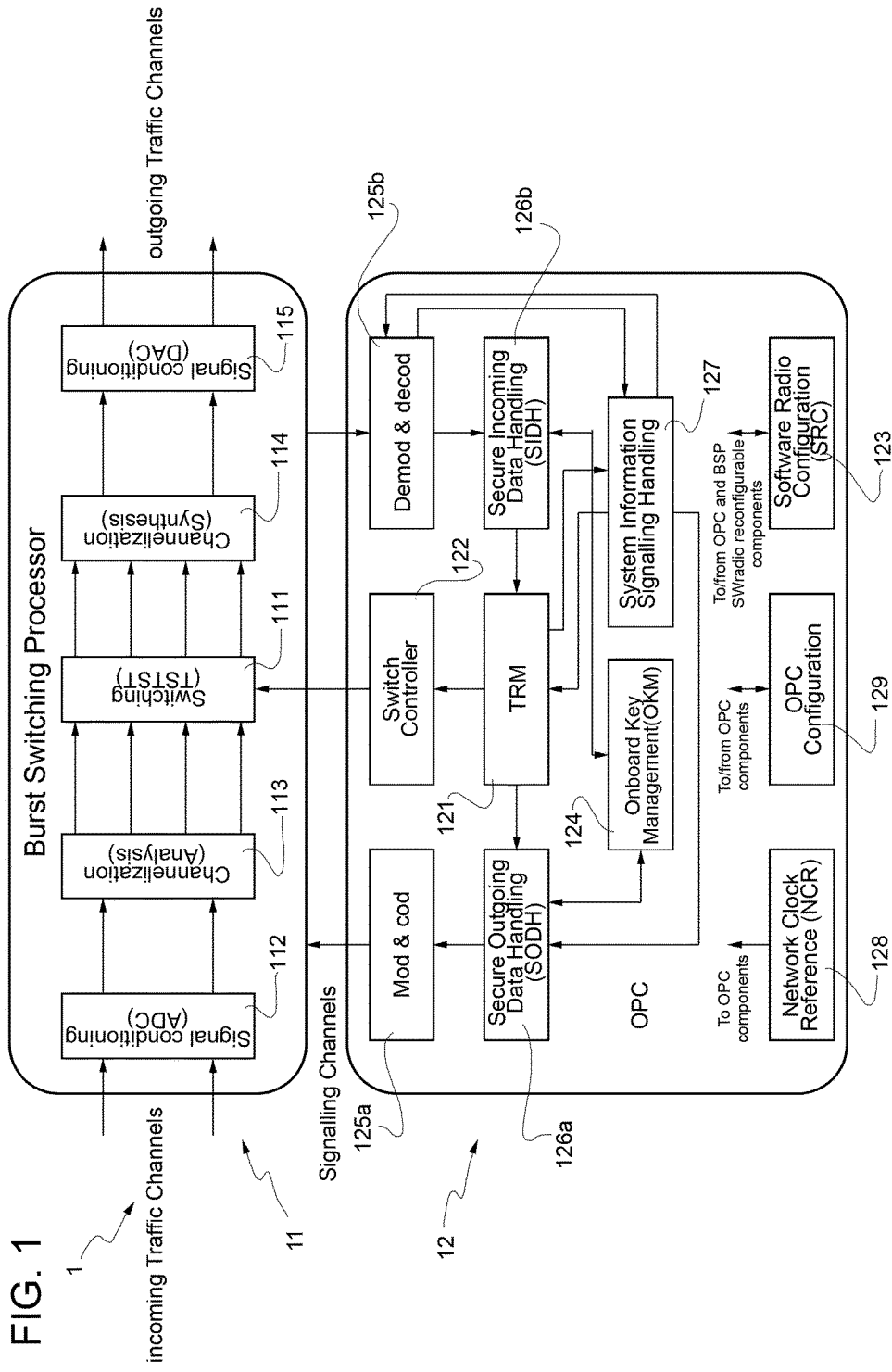
FIG. 1 schematically illustrates a reconfigurable hybrid payload system for use on board telecommunications satellites according to a preferred embodiment of the present invention.

For a better understanding of the present invention, FIG. 1 schematically illustrates a reconfigurable hybrid payload system (denoted as whole by 1) for use on board telecommunications satellites according to a preferred embodiment of the present invention.

In particular, the reconfigurable hybrid payload system 1 includes:
- a digital transparent switching/routing sub-system, that in the following will be referred to as Burst Switching Processor (BSP) and that in FIG. 1 is denoted as a whole by 11; and
- a reconfigurable regenerative dynamic control sub-system based on SDR technology, that in the following will be referred to as On-board Processor Controller (OPC) and that in FIG. 1 is denoted as a whole by 12.

In detail, the OPC 12 is preferably designed to:
- process signaling messages received from ground terminals (not shown in FIG. 1);
- manage traffic resources;
- control, frame-by-frame and in real-time, the BSP 11 for what concerns input-to-output interconnections, so as to dynamically assign the available resources to different satellite beams on the basis of ground terminals' needs; and
- handle control messages received from a ground NCC (not shown in FIG. 1), on the basis of which said OPC 12 can be reconfigured.

More in detail, the OPC 12, that is a regenerative processor reconfigurable by the ground NCC via SDR technology, is conveniently designed to carry out:
- modulation/demodulation and coding/decoding of the control and signaling channels;
- handling of capacity requests and assignment of the resources with Quality of service (QoS) differentiation;
- a non-blocking switch control algorithm so as to compute, in an extremely rapid fashion, switch control commands for both unicast and multicast/broadcast scenarios;
- optimization of the payload resources (power and spectrum/channels vs. beams) on the basis of carrier-to-noise ratio (C/N) measurements extracted from signaling request data received by the OPC 12 from different channels; and
- a secure signaling message handling with encryption/decryption functions.

More and more in detail, the OPC 12 preferably includes:
- a Traffic Resource Manager (TRM) 121;
- a switch controller 122;
- a Software Radio Configuration (SRC) unit/module 123;
- an On-board Key Management (OKM) unit/module 124;
- a modulation and coding unit/module 125*a* and a corresponding demodulation and decoding unit/module 125*b*;
- a Secure Outgoing Data Handling (SODH) unit/module 126*a* and a corresponding Secure Incoming Data Handling (SIDH) unit/module 126*b*;
- a system information signaling handling unit/module 127;
- a Network Clock Reference (NCR) unit/module 128; and
- an OPC configuration unit/module 129.

In use, the TRM 121 handles the capacity requests received from the ground terminals (i.e., user terminals) and the control messages received from the ground NCC. In particular, said TRM 121 includes an on-board database (conveniently updated by the OPC configuration unit/module 129), which stores data and information indicating the characteristics of the resources (configuration of the channels) and the end-to-end connections (typologies, involved terminals, QoS, etc.) communicated by the ground NCC through the control channels. By using said database, which is updated when necessary by the ground NCC through dedicated signaling messages, the TRM 121 handles the capacity requests from the ground terminals by assigning the requested resources, if available, on the basis of a priority order which is established by the QoS rules, and generates a routing map indicating switch input-to-output interconnections corresponding to the resource assignment performed.

The switch input-to-output interconnections are implemented in a switching unit/module 111 of the BSP 11 on the basis of the routing map which is generated by the TRM 121 and which allows the BSP 11 to establish, on a frame by frame basis, the output channels on the basis of stored data related to the input channels. Conveniently, the switch controller 122 generates the commands towards the switching unit/module 111 on the basis of the routing map (provided by the TRM 121) by implementing four predefined algorithms, namely a rank-based algorithm, an interval splitting algorithm, a modified self-routing algorithm, and a looping algorithm.

Moreover, the SRC unit/module 123, in use, implements the reconfiguration procedure and stores, after an integrity check, the configuration data received from the ground Network Control Centre (NCC) and/or a ground Mission Control Center (MCC); the OKM unit/module 124 implements the key management on the secure link between the OPC 12 and the ground NCC and/or MCC; the modulation and coding unit/module 125*a* and the demodulation and decoding unit/module 125*b* carry out, respectively, modulation and coding, and demodulation and decoding of the control and signaling channels; and the SODH unit/module 126*a* and the SIDH unit/module 126*b* perform secure signaling message handling by carrying out encryption/decryption functions.

Figure 2:
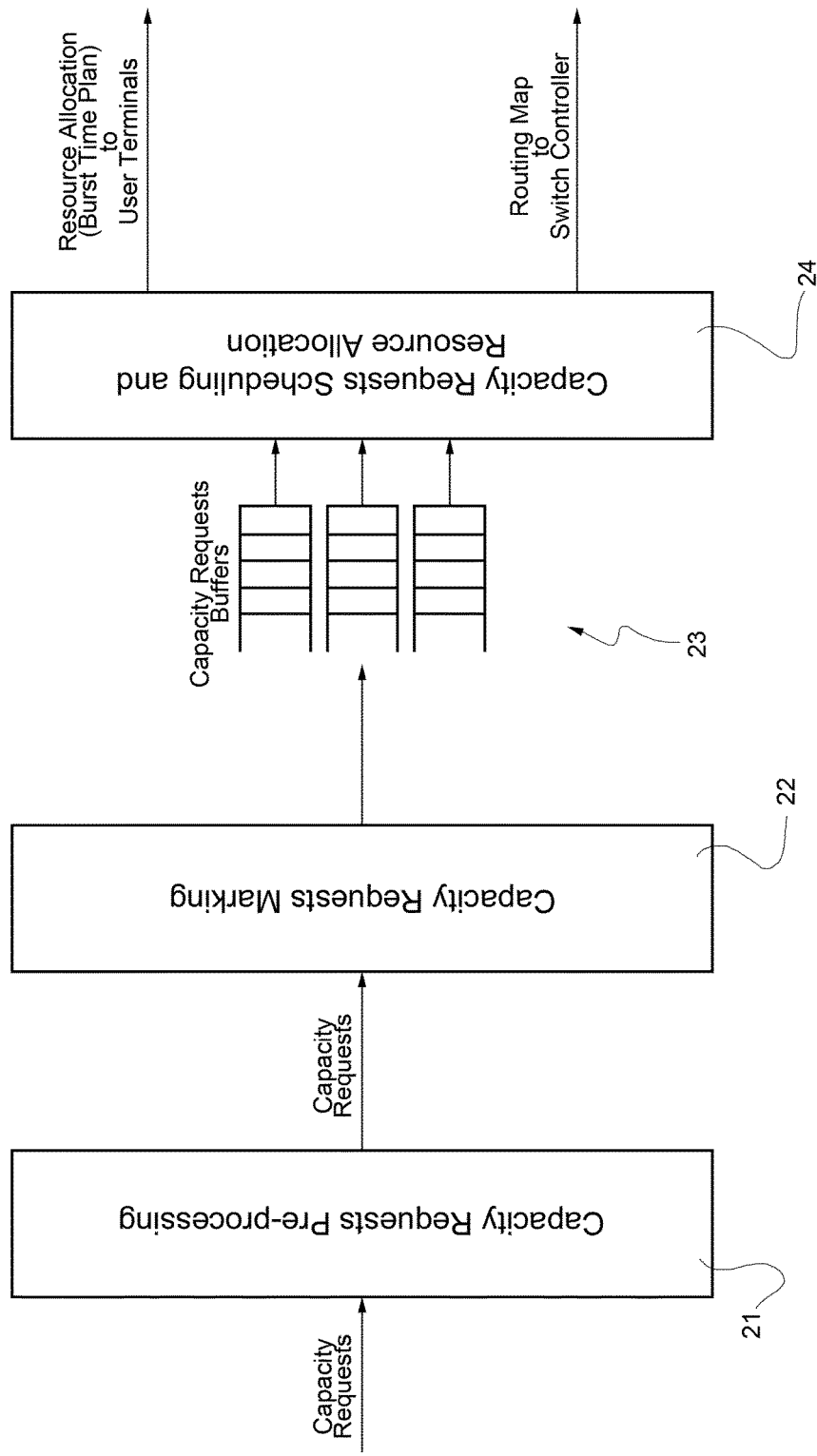
FIG. 2 schematically illustrates capacity request processing performed by a Traffic Resource Manager of the reconfigurable hybrid payload system of FIG. 1.

The TRM 121, during operation, handles the incoming capacity requests and consequent generation of resource assignment messages for the ground terminals and generates a corresponding routing map, which is used by the switch controller 122 to generate the switch configuration commands for the switching unit/module 111 of the BSP 11. In this respect, FIG. 2 schematically illustrates capacity request processing performed by the TRM 121. In particular, as shown in FIG. 2, said capacity request processing includes:
- pre-processing (block 21) the capacity requests received from the ground terminals (i.e., user terminals) to check their authorization (verifying whether the terminal is allowed to request for capacity or not), and their syntactical consistency (error check, missing fields, etc.);

wherein pre-processing (block 21) requires the knowledge of the authorized terminals, as well as the relevant end-to-end connection parameters which are available in the on-board database;
- marking (block 22) admitted capacity requests with a respective priority level and a respective timestamp; wherein the timestamp, that is assigned on the basis of time of arrival of the capacity request, is aimed to prevent request starvation and unfair allocations on the basis of a timeout associated with a capacity request type; the priority level is associated with the specific ground terminal emitting the capacity request and it is aimed to differentiate (in the frame of a QoS class) which ground terminal is to be served before others; the priority level is computed by the TRM 121 on the basis of the terminal and/or group and/or mission information configured within the on-board database by taking into account the content of the capacity request (Terminal_id, Routing_id);
- after marking (block 22), the capacity requests are queued (i.e., buffered) according to the QoS class they pertain to (block 23); the information on the QoS class is conveyed in the frame of each capacity request as a subfield of the Routing_id information element; in particular, four QoS classes are identified (Constant Rate, Real Time, Critical Data, Best Effort) and the capacity requests associated with the different QoS classes are served in the following order:
1. Constant Rate,
2. Real time,
3. Critical Data,
4. Best effort;

capacity request scheduling and resource (in particular bandwidth) allocation is then carried out (block 24); the bandwidth allocation includes determining which uplink (U/L) slot(s), within the Frame, can be used by which ground terminal and which is the associated downlink (D/L) slot(s); the allocation process assigns resources to a requesting ground terminal on the basis of the perimeter established at end-to-end connection setup level for the different QoS classes and arbitrated by the ground control; it also takes into account the expiration time of the capacity requests in order to de-allocate resources (on the basis of the timestamp) if no updates are received; after the slots have been allocated, the information is communicated to the ground terminals by generating a burst time plane containing the Routing_id and Terminal_id the assignment refers to; at the same time a routing map is generated aimed to implement the switch configuration; the routing map is generated on the basis of the following information resulting from the bandwidth allocation process:
allocated time slots identified by their time slot ids (in the frame of U/L and D/L carrier group(s)),
U/L frame identified by its frame id,
U/L superframe identified by a superframe counter,
U/L carrier group identified by its carrier group id,
Routing_id, which identifies (with a subset of its bits) the association between the U/L carrier group/slots with destination D/L carrier group(s)/slots.

The structure of the carrier groups, which is used in the frame of the allocation process as well as their representation in terms of array of Atomic Switched Information Blocks (ASIBs), is configured in the on-board database by the ground control.

In this connection, it is worth noting that in the present document, as it will be clear in the following, the terminology "Atomic Switched Information Block(s)" and the related acronym ASIB(s) are used to denote data blocks carrying traffic data (or even signaling data but capacity/resource requests), having, all, one and the same given time duration and one and the same given baseband bandwidth, and representing the elementary/basic blocks routed/switched by the hybrid processor system according to the present invention in space domain (in terms of (different) satellite beams used), in frequency domain (in terms of (different) frequency resources used) and in time domain (in terms of (different) time slots used).

The OPC 12 provides the following advantages:
reduction of access time to effectively support time-critical applications (e.g., voice); this performance can be further improved by implementing improved bandwidth on demand algorithms at user terminal level; in particular, propagation delay for resource request/assignment is reduced by half with respect to traditional systems implementing resource management at the ground segment; switch configuration is performed contextually with a resource assignment; short superframe duration due to fast switch configuration further reduces contribution to propagation delay;
dynamic optimization of the on-board payload resources on the basis of the network traffic;
resilience to security threats thanks to control data protection with communications security (COMSEC) mechanisms; and
flexibility in supporting waveform/standard evolution, thereby supporting the existing signaling protocol standards (at terminal, hubs level) and their modification via SDR management, in particular by means of the SRC unit/module 123.

Moreover, the BSP 11 is designed to implement digital transparent burst switching on incoming MF-TDMA channels and is a digital switch in frequency/space/time domain, whose main characteristics are:
non-blocking, but synchronized with MF-TDMA frames (multiple frame lengths permitted) so as to avoid packet losses due to concurrency on the same path within the switch;
implementation of an optimized fractional rate adaptation to allow non-critically sampled channelizers to store only strictly Nyquist rate information (Sum-to-One channelization—no fewer data can be stored without incurring in information loss);
capability of storing superframe structures in terms of Atomic Switching Information data Blocks (ASIBs);
Software Radio reconfigurable.

Figure 3:
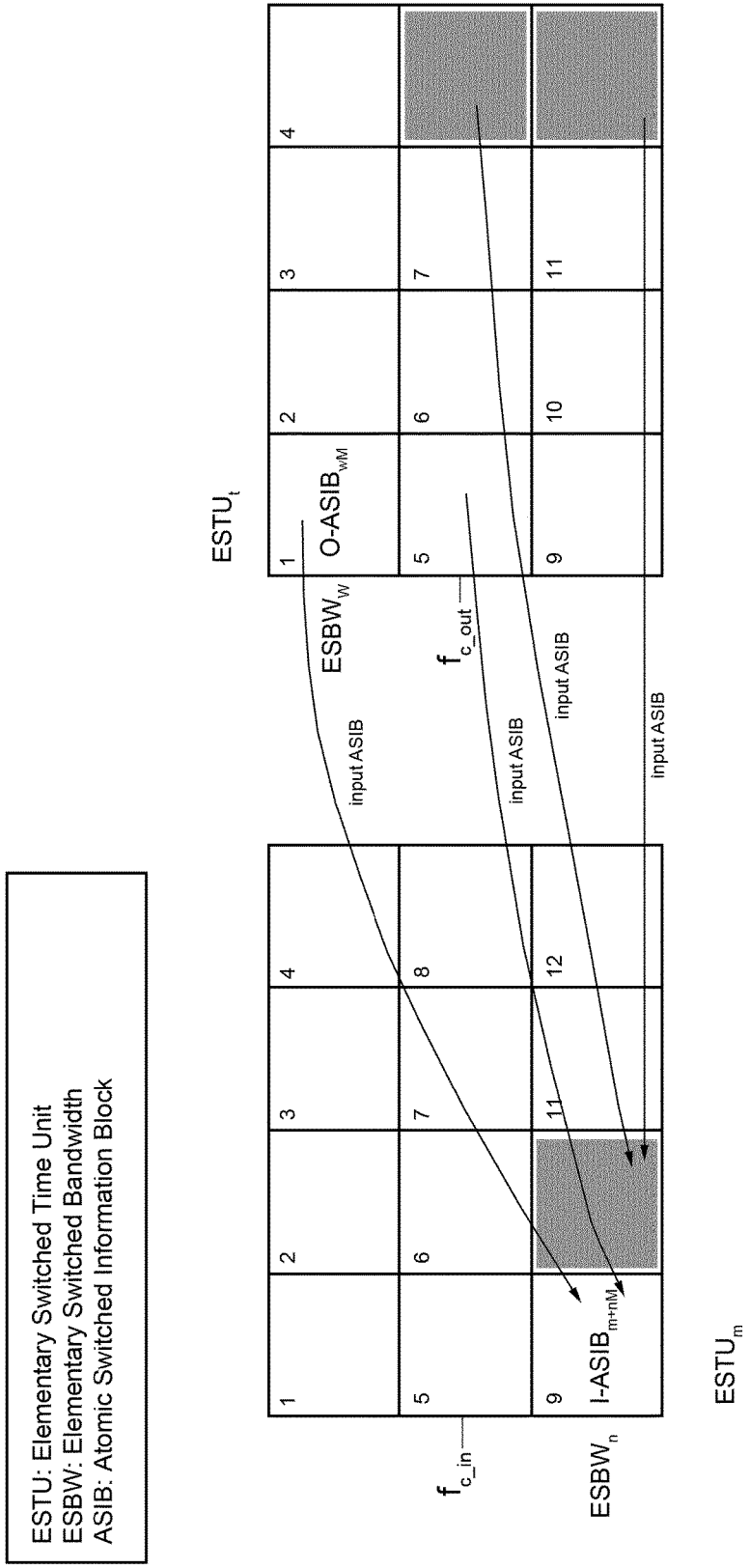
FIG. 3 schematically illustrates Atomic Switched Information Block (ASIB) switching concept according to an aspect of the present invention.

The BSP 11 provides the following advantages:
no packet losses introduced within the payload;
traffic data bursts are forwarded transparently without on-board regeneration with reduced power need and communication standards independency;
minimization of the on-board stored information thereby minimizing also memory storage requirements as well as power and mass budget;
support for multiple TDMA frame sizes and SCPC traffic access connectivity by applying appropriate manipulation and sequencing techniques of Frequency and Time slicing information blocks (in this respect, FIG. 3 schematically illustrates ASIB switching concept according to an aspect of the present invention).

In detail, with reference to both FIGS. 1 and 3, the BSP 11 includes:
input signal conditioning means 112 configured to apply analog-to-digital conversion (ADC) to input signals;
input channelization (analysis) means 113 configured to regularly and uniformly demultiplex the input signals into baseband slices (ASIBs), each ASIB being an elementary data block carrying a set of signal samples corresponding to an Elementary Switched Bandwidth (ESBW) and Elementary Switched Time Unit (ESTU); wherein said input channelization (analysis) means 113 are configured so as to operate as a fractional rate oversampling channelizer, differently from the integer rate classical ones (for example, as described in R. E. Crochiere and L. R. Rabiner: "*Multirate Digital Signal Processing*", Prentice Hall, 1983) scaling down to Nyquist minimum rate the information flow to be stored in the switching section;
the switching unit/module 111 (in the following, for the sake of simplicity, referred to also as switch), that is operable to route the ASIBs from any input channel to any output channel(s) with no limitation except for those ones relevant to the total output channel bandwidth; besides spatial switching (ESBW routed among different channels) and frequency switching (changing of the frequency position of the elementary bandwidth within the channels), the switching unit/module 111 performs also a temporal switching; to this end, the traffic transported on the different channels is organized into frames of fixed duration, wherein a frame includes time slots of duration equal to the ESTU, which are all stored in terms of Atomic Switching Information data Blocks (ASIBs) which in turn can be routed to any destination without blocking conditions;

output channelization (synthesis) means 114, which include fractional interpolation means that, after the switching carried out by the switching unit/module 111, restore the condition of oversampling required by the output channelization section; said output channelization (synthesis) means 114 re-modulating baseband slices back to compose the comprehensive bandpass signal; and output signal conditioning means 115 configured to apply digital-to-analog conversion (DAC) to signals received from the output channelization (synthesis) means 114.

So, as previously explained, the BSP 11 is in charge of switching, according to the routing map, every input information block (ASIB) to the output ports with the following features:

non-blocking switching capabilities;
broadcast and multicast capability (unicast being considered as a subcase of multicast connectivity);
multicast fanout with no limitations on the output ports;
flexible and modular hardware architecture oriented to minimization of the required hardware resources;
optimum-hardware-efficiency switch fabric with multicast capability by minimization of T and S modules;
fast core-algorithm designed for switch configuration with direct mathematical matrix-based computation; and
partitioned and parallel-computational algorithm for switch configuration commands fast and parallel computation.

More in detail, the switching unit/module 111 is configured to:

perform an on-board non-blocking switching function for both broadcast and multicast cases allowing any connection choice (mathematically, allowed dispositions shall be NN, N being the overall switch size, as explained in the following);
control the switch hardware in the shortest possible time to implement connectivity according to a DBAC, always finding a routing solution (the switch controller 122 computing frame-by-frame guaranteeing non-blocking configuration of the switching unit/module 111 such that to achieve the required connection); and
minimize the required hardware resources guaranteeing at the same time the modularity, scalability and flexibility of the overall architecture, optimally matching the hardware speed capability.

As is known, a three-stage Clos network is based on a fabric made up of elementary switches which can copy an input to all of the outputs and allow each output to be connected to any one of the inputs, for a total of NN different connection patterns, i.e., the most general and demanding connectivity potential that a switch can have. Such a three-stage Clos network is named broadcast Clos network. If the routing algorithm were known, this would be the simplest solution. But, unfortunately, it is unknown.

Hence, as also proposed in the aforesaid *"Principles of Broadband Switching and Networking"*, the switching unit/module 111 exploited by the present invention is a five-stage one, constructed by cascading a broadcast Clos network (copy network) and a Clos network (point-to-point) with the inner intermediate stage shared. Both the network sections of the overall switch 111 have been designed according to the Clos theory (as described in *"Principles of Broadband Switching and Networking"*), so the copy network and the unicast network are both three-stage Clos networks which are strictly non-blocking.

Figure 4:
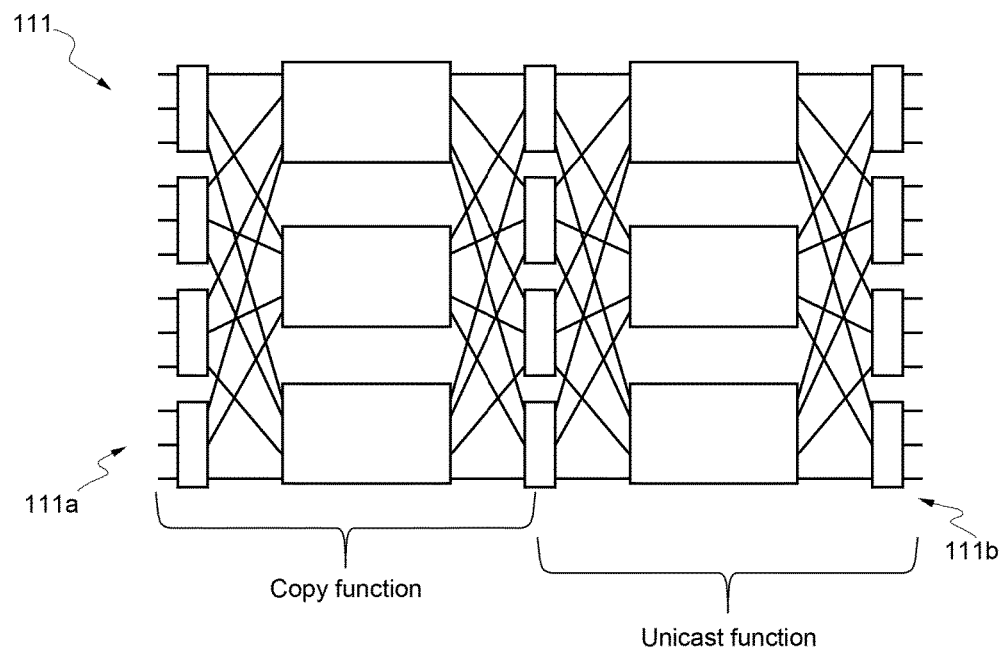
FIGS. 4 and 5 schematically illustrate a switching unit/module of the reconfigurable hybrid payload system of FIG. 1.
Figure 5:
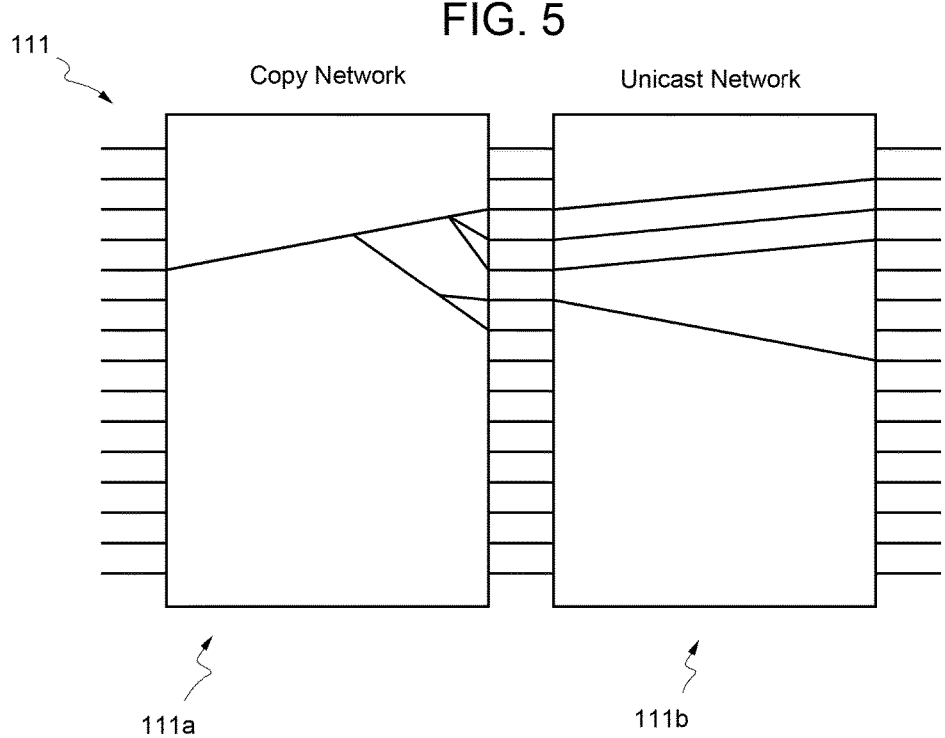

In this respect, FIGS. 4 and 5 schematically illustrate the switching unit/module 111, which is a five-stage Clos network including a first three-stage Clos network 111a and, in cascade, a second three-stage Clos network 111b (with inner intermediate stage shared) designed for, respectively, copy and unicast functions.

Said five-stage network 111 is named Generalized Connection Network (GCN) and is a switching network with N inputs and N outputs in which each output may be connected to any one of the inputs for a total of NN different connection patterns, wherein the routing algorithms for such a network are devised according to an aspect of the present invention.

If the set of connection requests is monotonic, route assignment can be done by a rank-based assignment algorithm for broadcast Clos networks (see again *"Principles of Broadband Switching and Networking"*). By using the rank-based assignment algorithm and a generalized interval splitting algorithm, the inputs are broadcasted to the outputs of the copy-network 111a in a non-blocking manner (see again *"Principles of Broadband Switching and Networking"*).

The generalized interval splitting algorithm is able to route in a non-blocking manner all the copies of an input only if they reach contiguous output ports (in this connection reference can be made to FIG. 5). This is not a restriction, but only an intermediate step, since the desired connectivity is achieved complementing this routing with the subsequent one-to-one unicast rearrangement. The routing of the unicast section 111b of the network is here the key problem.

As a matter of fact, the specific configuration of each elementary switch is computed by the on-board software which implements the routing algorithms starting from the routing map.

The proposed solution for the switch 111 is a TSTST architecture (see again *"Principles of Broadband Switching and Networking"*) with three different routing algorithms required to compute the correct switch configuration.

The devised architecture allows to select the best degree of parallelization which minimizes the required hardware resources, tailoring it accordingly to the selected hardware speed features. This is made scaling to a minimum the S stage dimensioning and handling it with multiple repeated operation of it to mimic a bigger S section for routing the multi-bit multi-sample structure of each ASIB to be transferred from input to output. As a matter of fact, the switch shall route N ASIBs handling the K individual multi-bit samples with same routing.

The structure of the TSTST N×N, $N=q_0*q_1$ interconnection network is:

1. First stage: $q_1$ memories with $q_0$ locations;
2. Second stage: $q_1*q_1$ S stage;
3. Third stage: $q_1$ memories with $q_0$ locations;
4. Fourth stage: $q_1*q_1$ S stage;
5. Fifth stage: $q_1$ memories with $q_0$ locations.

The routing controls for each S stage and the reading and writing sequence in the memories are computed by the on-board switch controller 122.

Figure 6:
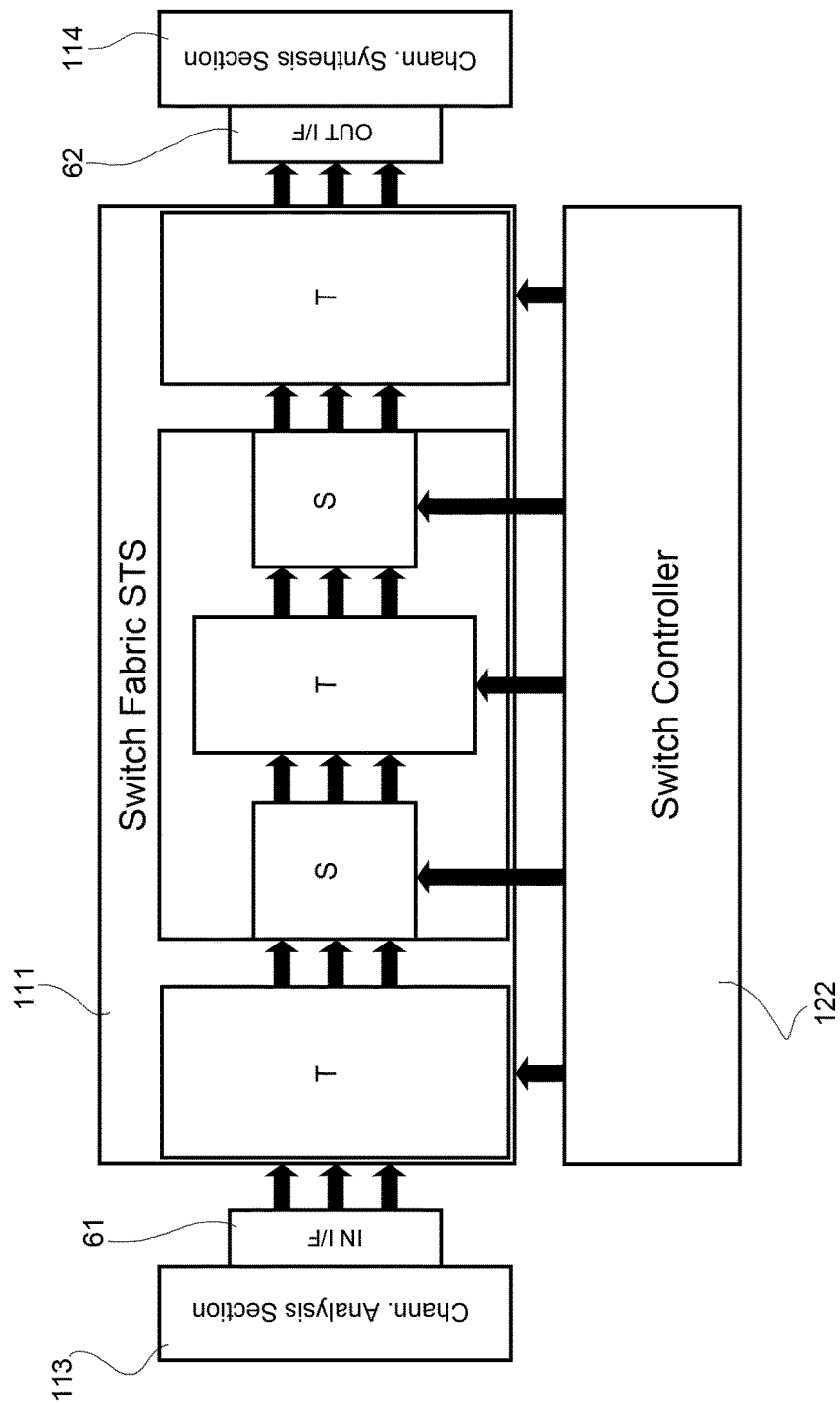
FIG. 6 schematically illustrates main components of the reconfigurable hybrid payload system of FIG. 1 that are involved in burst switching processing.

In this respect, FIG. 6 schematically illustrates the main components of the reconfigurable hybrid payload system 1 that are involved in the burst switching processing and that comprise: the input channelization (analysis) means 113 (in FIG. 6 equivalently named "Channelization Analysis section"), Input Interface (I/F) means 61, the Switch 111 having a TSTST architecture, Output Interface (I/F) means 62, the output channelization (synthesis) means 114 (in FIG. 6 equivalently named "Channelization Synthesis section"), and the switch controller 122.

In the following description of the routing algorithms, each S stage will be decomposed into internal stages of 2×2 elementary switches and hence in 2 $\log_2 q_1-1$ internal stages.

The TSTST switch 111 will be seen as a total of 1+(2 $\log_2 q_1-1$)+1+(2 $\log_2 q_1-1$)+1 stages.

The switching algorithms are general and not specifically oriented to a T or S partitioned implementation. However, slight interpretation changes can be applied to particularize them for S or T stages.

On the one hand, for the S sections, all of the following algorithms provide, for each stage, a single bit identifying to which of the 2 output ports the input is routed by the elementary switch element. On the other hand, when the algorithm has to address a T stage routing, it will provide the read addresses sequence (assuming the write sequential).

The innovative algorithm is matrix-manipulation-based and is always able to find the routing configuration of the network avoiding routing-block conditions.

The required routing map (i.e., the output rearrangement of input samples) allows a matrix representation of the switch 111. This matrix has properties that can be exploited in the computation of the routing configuration of each elementary block of the switch 111 because, mathematically, they exactly represent the blocking condition that occurs when even a single routing path is not checked and gets into conflict.

The input to output connections in the switch 111 are set on the basis of the routing map which is generated by the TRM 121 and which allows the BSP 11, on a frame by frame basis, to establish the output channels on the basis of the stored data relevant to the input channels. The switch controller 122 receives as input the routing map from the TRM 121 and generates the commands towards the switch 111 on the basis of the following algorithms:

rank-based algorithm;
interval splitting algorithm;
modified self-routing algorithm;
looping algorithm.

The ASIBs are routed from any input channel to any output channel(s) with no limitations except for those ones relevant to the total output channel bandwidth. In this respect, FIG. 7 schematically illustrates an example of multicast switching.

Besides spatial switching (ESBW routed among different channels) and frequency switching (changing of the frequency position of the elementary bandwidth within the channels), the switch 111 performs also a temporal switching in the MF-TDMA frame. The ASIBs that are routed to the different output ESBWs are organized into frames of fixed duration, wherein a frame includes time slots of duration equal to the ESTU.

An aspect of the present invention for hybrid on-board processing is based on a real-time dynamic switching element endowed with a modified self-routing algorithm which manages the central stage T and the last two stages S and T of the overall switching network 111 so as to meet the full-connectivity and non-blocking property of the network 111 (in this respect, reference can be made to FIG. 6). In particular, this algorithm is based on matrix manipulation and allows to avoid blocking condition always producing, via fast computation, a non-blocking routing configuration. In detail, this algorithm exploits the self-routing property of the Clos network. Starting from the connection request $(s_i, d_i)$ in a N×N network with N=pq (middle, or central, stage T of the network 111 includes p modules of q×q dimension), the routing tags (i.e., the output ports of modules) in stage 2 and 3 are:

$$\left(\left\lfloor \frac{d_i}{q} \right\rfloor; [d_i]_q\right),$$

where $$\left\lfloor \frac{d_i}{q} \right\rfloor$$

is the largest integer smaller than $$\frac{d_i}{q}$$

and $[d_i]_q = d_i \% q$ is the reminder of $$\frac{d_i}{q}.$$

The self-routing algorithm doesn't specify a simple way to find routing tag in stage 1; hence, it has been developed a simple way to find this routing tag starting from the $$\left\lfloor \frac{d_i}{q} \right\rfloor$$

information. As a matter of fact, the devised algorithm, arranging the $s_i$ and $d_i$ information in a matrix form, is able to assign the routing tag in stage 1 preventing all blocking conditions: hence, in association with the self-routing property, it is able to find the configuration of each elementary block of the switch for all of the NN possible configurations.

Figure 8:
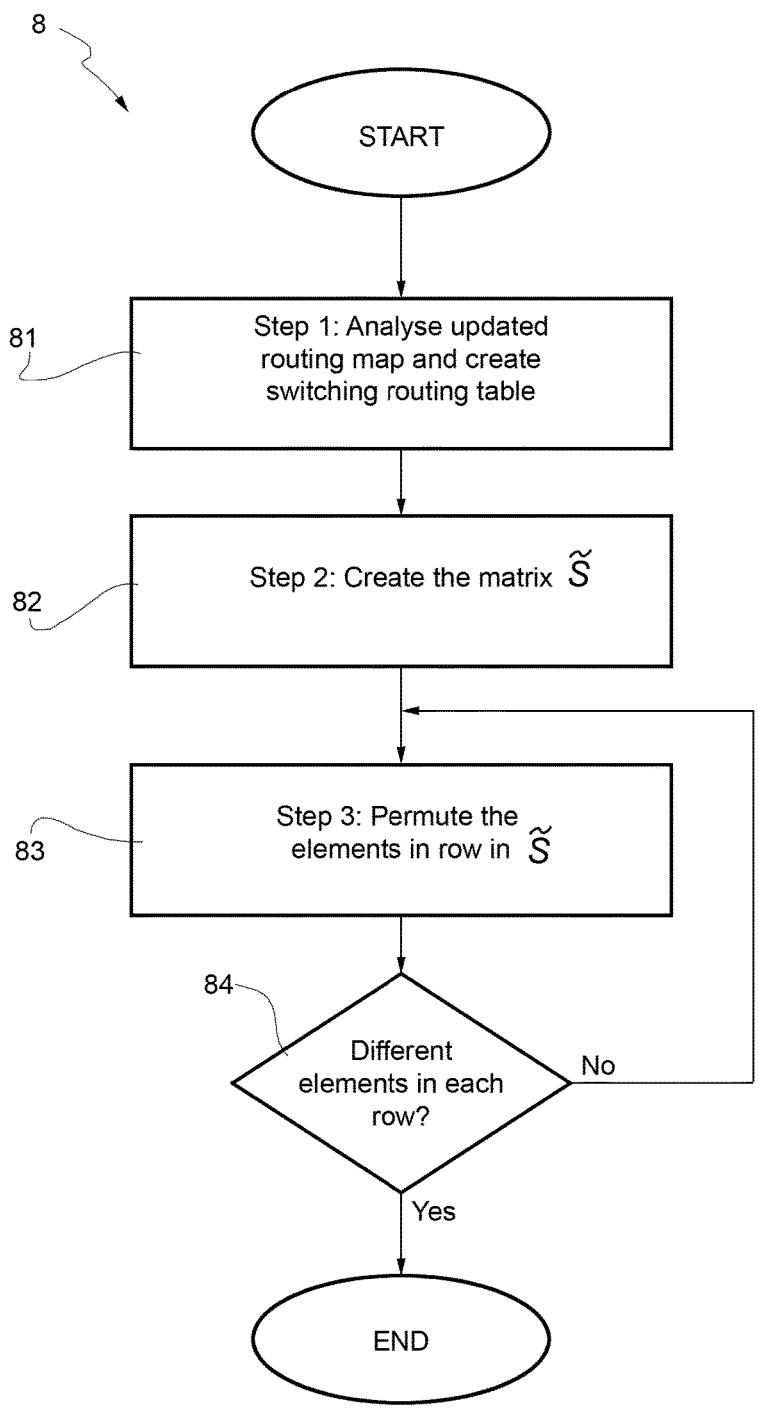
FIG. 8 schematically illustrates a modified self-routing algorithm according to an aspect of the present invention.

For a better understanding of the aforesaid modified self-routing algorithm, FIG. 8 shows a flowchart of this algorithm (denoted as whole by 8), whose steps will be described in detail in the following.

The routing map collects the input-output connections requests:

$$D=\{(s_0,D_0),(s_1,D_1),(s_2,D_2),\ldots,(s_{N-1},D_{N-1})\}$$

where $$D_0,D_1,\ldots,D_{N-1} \in \{d_0,d_1,\ldots,d_{N-1}\}$$

$$s_0,s_1,\ldots,s_{N-1} \in \{0,1,\ldots,N-1\},$$

and where $s_i = s_0, s_1, \ldots, s_{N-1}$ denote the indexes of the input ports, while $D_i = D_0, D_1, \ldots, D_{N-1}$ denote the indexes of the output ports.

Step 1 (block 81 in FIG. 8)—Starting from this routing map, creating the following switching routing table:

TABLE I

Switching routing table

| $s_i$ | $s_0$ | $s_1$ | ... | $s_{N-1}$ |
|---|---|---|---|---|
| $\tilde{s}_i = \left\lfloor \dfrac{s_i}{q_0} \right\rfloor$ | $\tilde{s}_0 = \left\lfloor \dfrac{s_0}{q_0} \right\rfloor$ | $\tilde{s}_1 = \left\lfloor \dfrac{s_1}{q_0} \right\rfloor$ | ... | $\tilde{s}_{N-1} = \left\lfloor \dfrac{s_{N-1}}{q_0} \right\rfloor$ |
| $D_i$ | $D_0$ | $D_1$ | ... | $D_{N-1}$ |
| $r_{2i} = \left\lfloor \dfrac{D_i}{q_0} \right\rfloor$ | $r_{20} = \left\lfloor \dfrac{D_0}{q_0} \right\rfloor$ | $r_{21} = \left\lfloor \dfrac{D_1}{q_0} \right\rfloor$ | ... | $r_{2N-1} = \left\lfloor \dfrac{D_{N-1}}{q_0} \right\rfloor$ |
| $r_{3i} = D_i \% q_0$ | $r_{30} = D_0 \% q_0$ | $r_{31} = D_1 \% q_0$ | ... | $r_{3N-1} = D_{N-1} \% q_0$ | where $$\left\lfloor \frac{s_i}{q_0} \right\rfloor$$

is the integer part of $$\frac{s_i}{q_0}, \left\lfloor \frac{D_i}{q_0} \right\rfloor$$

is the integer part of $$\frac{D_i}{q_0},$$

and $D_i \% q_0$ is the remainder of $$\frac{D_i}{q_0}.$$

The $r_{1i}$ parameter has now to be computed.

Step 2 (block 82 in FIG. 8)—creating the matrix:

$$\tilde{S} = \begin{pmatrix} \tilde{s}_{1,1} & \cdots & \tilde{s}_{1,q_0} \\ \cdots & \cdots & \cdots \\ \tilde{s}_{q_1,1} & \cdots & \tilde{s}_{q_0,q_1} \end{pmatrix},$$

where $\tilde{s}_{k,j} = s_i$ with $s_i : r_{2i} = k$, hence, the elements in each row has the same $r_2$. This matrix indicates the provenience block and loses the indication of the specific input port.

Step 3 (block 83 in FIG. 8)—the matrix $\tilde{S}$, in order to avoid space stage blocking conditions, has to be rearranged to create the matrix $\tilde{T}$ ($\tilde{S}$ is processed to get $\tilde{T}$) changing only the position of the elements in row (i.e., all the elements stay in the same row but change the column) such that in the new $\tilde{T}$ each row has different elements (block 84 in FIG. 8). Two inputs may not have same destinations in the middle stage output.

Starting from this matrix, the output sequence and hence the control of each elementary block is defined.

Finally, an efficient method to rearrange this matrix $\tilde{S}$ with respect to a trial and error approach, such that this property (i.e., each rows has different elements) is always verified, is applied.

Moreover, as far as the fractional decimator elements (i.e., the input channelization (analysis) means 113 and the output channelization (synthesis) means 114) are concerned, conventional multirate filter banks for spectrum analysis and synthesis (see, for example, the aforesaid "*Multirate Digital Signal Processing*") belong to two classes: critically and non-critically sampled. Critically sampled ones use the minimum sampling rate and have the decimation or interpolation ratio, M, equal to the number of bands, J, in which the spectrum is sliced; this solution is intrinsically bound to produce some amount of linear distortion at the band edges and is not usable in sum-to-one channelizers. Non-critically sampled ones, suitable for sum-to-one applications, have J=IM where I is a positive integer, as defined in paragraph 7.2.4 of "*Multirate Digital Signal Processing*", named oversampling ratio. This factor indicates that sliced bands, J=IM, are I times higher in number than the decimation or interpolation factor. Hence, I also determines the amount by which the filter bank signals are oversampled from their theoretical minimum rate (that is, if I=1, it is critically sampled and if I=2 it is oversampled by a factor of 2).

The relation J=IM indicates also that the channelizer input sampling rate, being decimated by a factor smaller than the number of bands, produces at the output of the analysis section an overall sampling rate that exceeds the Nyquist rate by an integer factor I.

"*Multirate Digital Signal Processing*" indicates I as a rigidly integer factor and describes the analysis and synthesis mechanization. However, there is an unnecessary rate increase in the integer assumption for I. When the information flow at the output of the analysis channelizer needs to be stored in a satellite payload and the whole MF-TDMA frame needs storage, the on-board memory availability is at a premium, so it is highly desired that the information flow at the storage point is kept to the minimum, i.e. strictly down to the theoretical Nyquist sampling rate. Integer I in "*Multirate Digital Signal Processing*" does not lead to optimum solution endowed with the desired minimum rate storage.

Therefore, an aspect of the present invention relates to the input channelization (analysis) means 113 (and their associated functional algorithm) that implements a minimum Nyquist data rate sum-to-one analysis channelizer, implementing a fractional oversampling factor at its output, differently from the integer I of the traditional theory.

Figure 9:
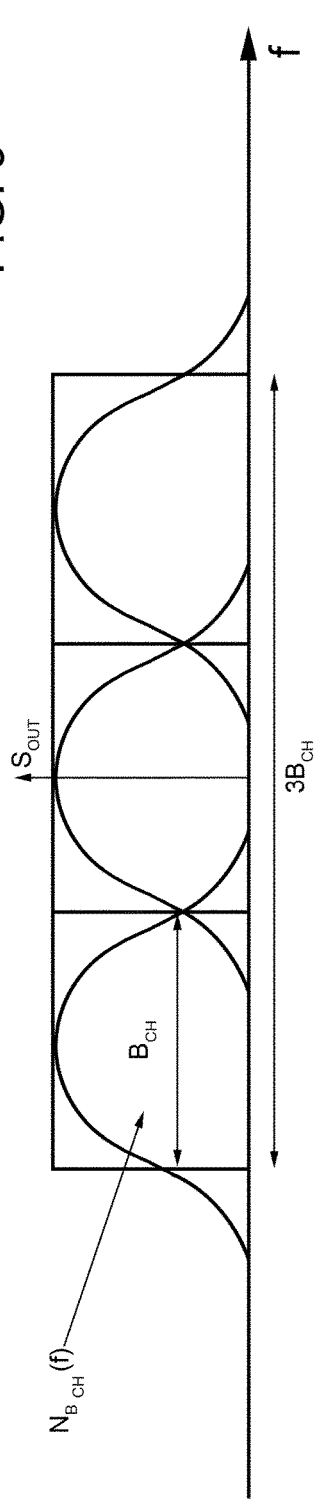
Figure 9:
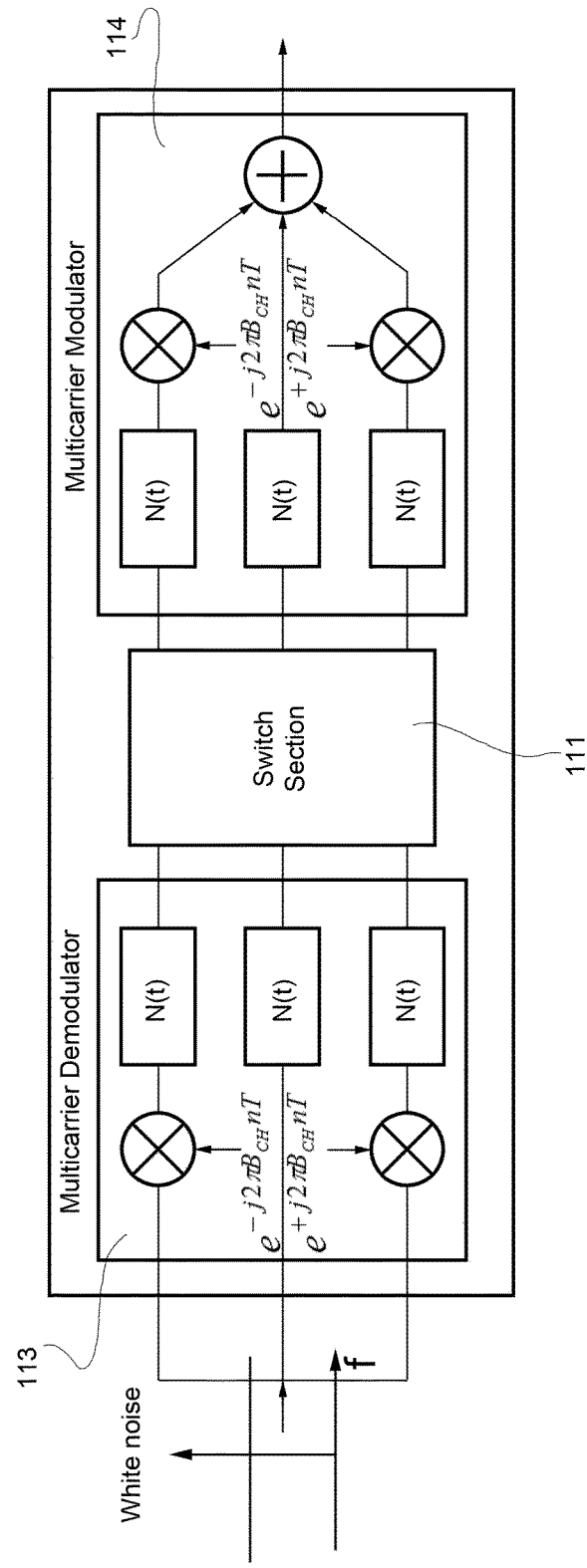

In this respect, FIG. 9 schematically illustrates the input channelization (analysis) means 113 and the output channelization (synthesis) means 114 operating, respectively, as a multicarrier demodulator and a multicarrier modulator according to sum-to-one concept by means of a plurality of Finite Impulse Response (FIR) filters implementing fractional rate oversampling so as to to store only strictly Nyquist rate information (no fewer data can be stored without incurring in information loss). Moreover, FIG. 10 shows trade-off between bandwidth efficiency and complexity.

In view of the foregoing, differences between the present invention and known solutions are immediately clear.

In particular, it is worth noting that the present invention, differently from the known solutions, concerns a reconfigurable hybrid on-board processor which combines a digital transparent switching/routing stage (i.e., the BSP 11) operable to perform switching/routing in Frequency/Space/Time domain, with a regenerative dynamic switching control section (i.e., the OPC 12) based on reconfigurable software radio technologies and implementing a non-blocking switch routing scheme in Frequency, Space and Time domain.

Moreover, it is worth noting again that the data communication satellite system according to U.S. Pat. No. 6,377,561 B1 has a fully regenerative architecture with an air interface and waveform supporting ATM-like cells and wherein both traffic and signaling data are demodulated. In fact, as previously explained, according to U.S. Pat. No. 6,377,561 B1, capacity requests are transmitted in-band (i.e., an in-band signaling approach is used) and, hence, there is the need to demodulate all received data packets in order to extract information data, capacity-request-related data and traffic routing data.

On the contrary, the present invention relates to a hybrid processor system (i.e., the reconfigurable hybrid on-board processor system 1) wherein the traffic data, structured in ASIBs, are not demodulated/remodulated and transit with digital transparent processing through the BSP 11, while only the signaling data are demodulated/remodulated by the OPC 12, which has a reconfigurable air-interface logic to dynamically control the switching of ASIBs in Frequency, Space and Time domain with different structures of superframe.

In fact, as previously described, the reconfigurable hybrid on-board processor 1 combines a digital transparent switching/routing stage (i.e., the BSP 11) with a regenerative dynamic switching control section (i.e., the OPC 12) with Frequency/Space/Time routing control capabilities for multi-beam satellite connectivity, wherein said regenerative dynamic switching control section (i.e., the OPC 12) exploits reconfigurable software radio technologies and implements fast non-blocking switch routing algorithms driven by a dynamic bandwidth allocation scheme to dynamically control the digital transparent switching/routing stage (i.e., the BSP 11) so that the latter switches several traffic bursts in frequency, space and time domain on different destination satellite beams.

A similar reasoning applies also to US 2012/300697 A1, which relates to a fully regenerative architecture too.

Moreover, as for the resource manager according to US 2003/166401 A1, it is worth noting again that, differently from the present invention which implements a non-blocking switch routing, the solution according to US 2003/166401 A1 is based on a blocking switch approach, due to which it is necessary to implement congestion control and mitigation.

Finally, it is worth noting also that EP 2 728 770 A2 teaches to use a three-stage Clos switch network, while the present invention exploits a five-stage Clos network dynamically controlled on the basis of a non-blocking routing configuration provided by the OPC 12. Moreover, it is to be noted also that, according to EP 2 728 770 A2, only frequency slices are switched, while the present invention allows to store on board the full superframe structures and control the switching of ASIBs in frequency space and time domain while concurrently supporting different structures of superframe (multi-framing capability).

From the foregoing description the technical advantages of the present invention are immediately clear.

In particular, it is important to point out that the present invention allows to uncouple on-board design from the frequency plans (frame size and channel frequency placement) providing mechanisms such that to apply a multi-framing on-board switching approach with minimized information storage for both TDMA and SCPC traffic access connectivity.

Advantages of the present invention for multi-beam Satcom systems are:

a novel telecommunications satellite payload system concept/solution based on hybrid on-board processing with DBAC-based switching control for connection-oriented and fast packet switching communications;

fast non-blocking switch reconfiguration in frequency/space/time domain synchronous in a MF-TDMA network, based on digital transparent processor with low transition delay;

system concept based on SS-MF-TDMA;

user traffic distributed on several channels of a wide coverage scenario spread over the Earth on different satellite beams;

user traffic access for several different terminals for both Fixed Satellite Services (FSS) and Mobile Satellite Services (MSS);

user traffic exchanged in star and meshed topology with single hop connectivity and dynamic bandwidth request/allocation capability (DBAC);

waveform independence supported for traffic exchanges;

support for multi-beam global networks with cross-banding connectivity to provide datalinks on different frequency bandwidth and service areas;

bandwidth management scheme with fine granularity (even in the order of tens of KHz) dynamically assigned to different channels and satellite beams;

highly efficient use of on-board satellite resources with better support of incoming and switched traffic based on a dynamic resource management realized with a satellite on-board processing and routing stage;

dynamic switch routing of the traffic bursts managed by the on-board payload system on the basis of capacity requests received from the traffic segment or in-band signaling sent from a mission control centre;

carrier to noise and channel power utilization elaborated on board for possible payload resource optimizations;

encrypted signaling flows between the ground mission control centre and the satellite on-board processor;

unicast and multicast destination beam switching supported at burst level by the on-board payload system; and reconfigurable software radio management scheme designed for the evolution of the on-board processor regenerative functionality along the satellite lifetime.

In particular, the present invention provides the following features:

a non-blocking digital switch transparent processor in frequency/space/time domain to avoid packet losses, but synchronized with MF-TDMA frames (multiple frame lengths permitted);

a novel non-blocking switch control algorithm able to fast compute switch control commands by matrix properties manipulation for both unicast and multicast switching cases;

an optimized fractional rate adaptation to allow non-critically sampled channelizers to store only strictly Nyquist rate information (Sum-to-One channelization—no fewer data can be stored without incurring in information loss);

an SDR regenerative section with on-board traffic resource management able to:
  serve in single-hop the on-demand capacity requests from traffic terminals and dynamically assign resources (DBAC),
  serve the semi-permanent allocation requests received in-band by the Network Control Centre (NCC),
  support connection-oriented connectivity aligned with NCC, comply with existing DVB-RCS signaling standards, and control a real-time switching control setting in the minimum time so that prompt frame-based routing map reconfiguration and resource allocation is achieved;

support for multiple TDMA frame sizes and SCPC traffic access connectivity by applying appropriate manipulation and sequencing techniques of Frequency and Time slicing Information Blocks (ASIB concept);

optimization of the payload resources (power and spectrum/channels vs. beams) on the basis of C/N measurements, extracted from signaling requests data received by the TRM from different channels;

a secure TRM signaling message handling with on-board encryption/decryption functions;

an affordable on-board complexity while maintaining full MF-TDMA connectivity flexibility; and uncoupling of on-board design from the frequency plans (frame size and channel frequency placement) with a multiframing TDMA on-board switching able to support concurrent existence of multiple frame durations.

Moreover, it is important to stress again the point that the present invention is capable of storing (thanks to fractional rate oversampling synthesis and analysis channelizers) the minimum information possible, yet being capable to deploy full flexibility of MF-TDMA frame uplink/downlink routing with a frame-by-frame TDMA synchronous reconfiguration thanks to fast switch routing algorithms.

The present invention is intended for satellite payloads implementing fully meshed communications between end points (user terminals, gateways, etc.) with dynamic connectivity requirement.

In particular, by considering both civil and military scenarios where users, wherever they are, should be connected similarly on a common network, the present invention provides the possibility to dynamically route on board the satellite traffic packets to single or multiple destinations by providing the required connectivity based on DBAC.

In conclusion, it is worth noting that some aspects of the present invention, in particular the synthesis and analysis channelizers based on fractional rate oversampling and the switch based on a five-stage Clos network with the aforesaid modified self-routing algorithm, by virtue of their respective novel and advantageous features, can be advantageously exploited, each, independently from the other aspects of the present invention (i.e., they can be singularly exploited) and also for applications not necessarily of the satellite type (for example, for terrestrial telecommunications). Therefore, the Applicant reserves the right to prosecute these subject-matters singularly in one or more divisional applications not necessarily related to satellite applications.

The invention claimed is:

1. Hybrid processor system (1) for use on board a telecommunications multi-beam satellite, wherein said telecommunications multi-beam satellite is controllable by a network control centre via one or more control channels, and is designed to link ground terminals by:

providing uplink and downlink traffic channels on several satellite beams;

routing atomic switched information blocks from the uplink traffic channels to the downlink traffic channels; and exchanging signaling data with the ground terminals on one or more uplink signaling channels and one or more downlink signaling channels;

wherein all the atomic switched information blocks have one and the same given time duration and one and the same given baseband bandwidth;

wherein each uplink traffic channel has a respective uplink bandwidth including respective uplink frequencies, and carries, at said respective uplink frequencies, respective atomic switched information blocks in respective uplink time slots organized into respective uplink time frames forming respective uplink time superframes;

wherein each downlink traffic channel has a respective downlink bandwidth including respective downlink frequencies, and carries, at said respective downlink frequencies, respective atomic switched information blocks in respective downlink time slots organized into respective downlink time frames forming respective downlink time superframes;

wherein said hybrid processor system (1) comprises:

a burst switching processor (11); and an on-board processor controller (12);

wherein said on-board processor controller (12) is configured to:

store service information items indicative of said given time duration and said given baseband bandwidth of the atomic switched information blocks, the respective uplink bandwidth, the respective uplink frequencies, a respective time length of the respective uplink time slots, and respective structure features of the respective uplink time frames and superframes of each uplink channel, the respective downlink bandwidth, the respective downlink frequencies, a respective time length of the respective downlink time slots, and respective structure features of the respective downlink time frames and superframes of each downlink channel, and quality of service and priority rules for serving the ground terminals;

extract, from incoming signaling data received on the uplink signaling channel(s), capacity requests sent by the ground terminals, wherein the capacity requests are extracted by the on-board processor controller (12) by demodulating and decoding the incoming signaling data;

assign to each pair or set of ground terminals to be linked respective frequency, space and time resources on the basis of the stored service information items and of all the capacity requests received from the ground terminals, wherein said respective frequency, space and time resources includes one or more respective uplink frequencies of one or more respective uplink channels provided on one or more respective satellite beams, one or more respective uplink time slots in one or more respective uplink time frames in one or more uplink time superframes of said one or more respective uplink channels, one or more respective downlink frequencies of one or more respective downlink channels provided on said one or more respective satellite beams, and one or more respective downlink time slots in one or more respective downlink time frames in one or more downlink time superframes of said one or more respective downlink channels;

generate resource assignment messages indicative of the frequency and time resources assigned to the ground terminals;

generate outgoing signaling data to be transmitted to the ground terminals on the downlink signaling channel(s), wherein the outgoing signaling data are generated by the on-board processor controller (12) by encoding and modulating the resource assignment messages;

generate a routing map on the basis of the frequency, space and time resources assigned to the ground terminals;

generate switching commands based on the routing map;

extract, from control data received on the control channel(s), control messages sent by the network control centre, wherein the control messages are extracted by the on-board processor controller (12) by demodulating, decoding and decrypting the control data; and update the stored service information items on the basis of the control messages;

wherein the burst switching processor (11) is configured to route the atomic switched information blocks on the basis of the switching commands generated by the on-board processor controller (12);

whereby:

the on-board processor controller (12) is configured to operate in a regenerative way with respect to the signaling data, and is reconfigurable by the network control centre; and the burst switching processor (11) is configured to operate in a digital transparent way with respect to the atomic switched information blocks, and is operable by the on-board processor controller (12) to route the atomic switched information blocks in frequency, space and time domains.

2. The hybrid processor system of claim 1, wherein the burst switching processor (11) comprises a five-stage Clos switching network (111) including a first three-stage Clos network (111a) and, in cascade, a second three-stage Clos network (111b) designed for, respectively, copy and unicast functions;

wherein said five-stage Clos switching network (111) includes an inner intermediate stage shared by said first (111a) and second (111b) three-stage Clos networks;

and wherein the on-board processor controller (12) is configured to generate the switching commands by implementing a self-routing algorithm (8) including:

generating, on the basis of the routing map, a matrix representing the five-stage Clos switching network (111); and processing said matrix so as to produce a non-blocking routing configuration for said five-stage Clos switching network (111).

3. The hybrid processor system of claim 2, wherein the five-stage Clos switching network (111) has a TSTST architecture, and wherein the on-board processor controller (12) is configured to implement the self-routing algorithm (8) to manage the inner intermediate T stage and the last S and T stages of said five-stage Clos switching network (111).

4. The hybrid processor system according to claim 2, wherein the on-board processor controller (12) is configured to generate the switching commands by implementing also a rank-based algorithm, an interval splitting algorithm and a looping algorithm.

5. The hybrid processor system according to claim 1, wherein the burst switching processor (11) comprises a channelization analysis section (113) configured to perform fractional rate decimation and a channelization synthesis section (114) configured to perform fractional rate interpolation.

6. The hybrid processor system of claim 5, wherein the burst switching processor (11) further comprises input signal conditioning means (112) configured to apply an analog-to-digital conversion to incoming analog traffic signals received on the uplink traffic channels, thereby producing incoming digital traffic signals;

wherein the channelization analysis section (113) is connected to the input signal conditioning means (112) to apply the fractional rate decimation to the incoming digital traffic signals, thereby producing incoming atomic switched information blocks;

wherein the burst switching processor (11) further comprises a five-stage Clos switching network (111), that is connected between the channelization analysis section (113) and the channelization synthesis section (114), and that is configured to carry out a switching of the incoming atomic switched information blocks on the basis of the switching commands generated by the on-board processor controller (12), thereby producing outgoing atomic switched information blocks;

wherein the channelization synthesis section (114) is configured to apply the fractional rate interpolation to the outgoing atomic switched information blocks, thereby producing outgoing digital traffic signals;

and wherein the burst switching processor (11) further comprises output signal conditioning means (115) configured to apply a digital-to-analog conversion (DAC) to the outgoing digital traffic signals, thereby producing outgoing analog traffic signals to be transmitted on the downlink traffic channels.

7. The hybrid processor system according to claim 1, wherein the on-board processor controller (12) is further configured to:

mark the capacity requests received from the ground terminals by assigning to each capacity request
a respective timestamp on the basis of a respective time of arrival of said capacity request, and
a respective priority level on the basis of the stored service information items indicative of the quality of service and priority rules for serving the ground terminal that has sent said capacity request; and assign the frequency and time resources to the ground terminals on the basis of the marked capacity requests.

8. The hybrid processor system according to claim 1, wherein the service information items are also indicative of connection features related to the ground terminals.

9. Satellite for telecommunications, that is controllable by a network control centre via one or more control channels and is designed to link ground terminals by:

providing uplink and downlink traffic channels on several satellite beams;

routing atomic switched information blocks from the uplink traffic channels to the downlink traffic channels; and exchanging signaling data with the ground terminals on one or more uplink signaling channels and one or more downlink signaling channels;

wherein all the atomic switched information blocks have one and the same given time duration and one and the same given baseband bandwidth;

wherein each uplink traffic channel has a respective uplink bandwidth including respective uplink frequencies, and carries, at said respective uplink frequencies, respective atomic switched information blocks in respective uplink time slots organized into respective uplink time frames forming respective uplink time superframes;

wherein each downlink traffic channel has a respective downlink bandwidth including respective downlink frequencies, and carries, at said respective downlink frequencies, respective atomic switched information blocks in respective downlink time slots organized into respective downlink time frames forming respective downlink time superframes;

and wherein said satellite comprises the hybrid processor system (1) as claimed in claim 1.

\* \* \* \* \*